US007647314B2

(12) United States Patent
Sun et al.

(10) Patent No.: US 7,647,314 B2
(45) Date of Patent: Jan. 12, 2010

(54) SYSTEM AND METHOD FOR INDEXING WEB CONTENT USING CLICK-THROUGH FEATURES

(75) Inventors: Gordon Sun, Redwood Shores, CA (US); Zhaohui Zheng, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 261 days.

(21) Appl. No.: 11/414,405

(22) Filed: Apr. 28, 2006

(65) Prior Publication Data

US 2007/0255689 A1    Nov. 1, 2007

(51) Int. Cl.
*G06F 7/00*    (2006.01)
*G06F 17/30*    (2006.01)

(52) U.S. Cl. .................................. 707/5; 707/7; 706/12

(58) Field of Classification Search ........................ None
See application file for complete search history.

(56) References Cited

U.S. PATENT DOCUMENTS

| 7,197,497 | B2 * | 3/2007 | Cossock ........................ 707/7 |
| 7,222,127 | B1 * | 5/2007 | Bem et al. ................... 707/102 |
| 7,231,399 | B1 * | 6/2007 | Bem et al. ................... 707/102 |
| 2002/0049752 | A1 * | 4/2002 | Bowman et al. ................ 707/3 |
| 2002/0123988 | A1 * | 9/2002 | Dean et al. ..................... 707/3 |
| 2004/0205044 | A1 * | 10/2004 | Su et al. ........................ 707/2 |
| 2005/0021397 | A1 * | 1/2005 | Cui et al. ...................... 705/14 |
| 2005/0071741 | A1 * | 3/2005 | Acharya et al. ............. 715/500 |
| 2005/0149504 | A1 * | 7/2005 | Ratnaparkhi .................... 707/3 |
| 2007/0179949 | A1 * | 8/2007 | Sun et al. ........................ 707/6 |
| 2007/0214118 | A1 * | 9/2007 | Schoen et al. .................. 707/3 |

OTHER PUBLICATIONS

Thorsten Joachims, "Optimizing Search Engine using Click through Data", SIGKDD Jul. 23-26, 2002 Edmonton, Alberta, Canada p. 133-140.*
Freund, Y. et al., "An Efficient Boosting Algorithm for Combining Preferences", Journal of Machine Learning Research, vol. 4, Dec. 2003, p. 933-969.*

* cited by examiner

*Primary Examiner*—Neveen Abel Jalil
*Assistant Examiner*—Vei-Chung Liang
(74) *Attorney, Agent, or Firm*—Seth H. Ostrow; Ostrow Kaufman & Frankl LLP

(57) ABSTRACT

System and method for the determination of the relevance of a content item to a query through the use of a machine learned relevance function that incorporates click-through features of the content items. A method for selecting a relevance function to determine a relevance of a query-content item pair comprises generating training set having one or more query-URL pairs labeled for relevance based on their click-through features. The labeled query-URL pairs are used to determine the relevance function by minimizing a loss function that accounts for click-through features of the content item. The computed relevance function is then applied to the click-through features of unlabeled content items to assign relevance scores thereto. An inverted click-through index of query-score pairs is formed and combined with the content index to improve relevance of search results.

11 Claims, 4 Drawing Sheets

SYSTEM AND METHOD FOR INDEXING WEB CONTENT USING CLICK-THROUGH FEATURES

RELATED APPLICATIONS

This application is related to commonly owned U.S. patent application Ser. No. 10/424,170, filed on Apr. 25, 2003 and titled "METHOD AND APPARATUS FOR MACHINE LEARNING A DOCUMENT RELEVANCE FUNCTION," and U.S. patent application Ser. No. 11/343,910, filed on Jun. 30, 2006 and titled "LEARNING RETRIEVAL FUNCTIONS INCORPORATING QUERY DIFFERENTIATION FOR INFORMATION RETRIEVAL," both of which are hereby incorporated by reference herein in their entirety.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to information searching and retrieval and, more specifically, to the determination of relevance of content items retrieved in response to a search query based on the click-through features of the content items.

BACKGROUND OF THE INVENTION

The Internet, which allows access to billions of content items stored on host computers around the world, represents a particularly diverse and large collection of content items. Development of a search engine that can such index a large and diverse collection of content items, yet provide the user a short, relevant result set of content items in response to a query has long been recognized as a problem in information retrieval. For example, a user of a search engine typically supplies a query to the search engine that contains only a few terms and expects the search engine to return a result set comprising relevant content items. Although a search engine may return a result set comprising tens, hundreds, or more content items, most users are likely to only view the top several content items in the result set. Thus, to be useful to a user, a search engine should determine those content items in a given result set that are most relevant to the user, or that the user would be most interested in, on the basis of the query that the user submits.

A user's perception of the relevance of a content item to a query is influenced by a number of factors, many of which are highly subjective. These factors are generally difficult to capture in an algorithmic set of rules represented by a relevance function. Furthermore, these subjective factors may change over time, as for example when current events are associated with a particular query term. As another example, changes over time in the aggregate content of the content items available through the Internet may also alter a user's perception of the relative relevance of a given content item to a given query. Users who receive search result sets that contain results not perceived to be highly relevant become frustrated and potentially abandon the use of the search engine. Designing effective and efficient retrieval functions is therefore of high importance to information retrieval In the past, search engine designers have attempted to construct relevance functions that take a query and a content item as a set of inputs and return a relevance value, which indicates the relevance of the content item to the query. The relevance value may be used, for example, to order by relevance a set of content items that are responsive to a given query. For the ordering to be useful, however, the underlying relevance function should accurately and quickly determine the relevance of a given content item to a given query. Many retrieval systems and methods are known to those of skill in the art, including vector space models, probabilistic models and language modeling methods. In constructing its relevance functions, however, existing retrieval systems do not effectively use information regarding user-made judgments of the relevance of a content item to a given queries expressed as clickthrough information, which enables formulation of relevance functions with improved accuracy and effectiveness over existing systems and techniques.

SUMMARY OF THE INVENTION

Click-through information collected by the search engines during searching and retrieval of content items in response to user queries reflects user preferences and can be considered as implicit user judgment on the relevance of a content item to a query. To that end, disclosed herein are systems and methods for incorporating click-through-feature-based indexing for the identification of content items that are relevant to a given query. The system is operative to extract click-through features of query-content item pairs and apply machine learning, e.g., regression methods and decision trees, to learn a click score function. The sample space for feature-oriented methods is the collection of the click-through feature vectors in the corpus of content items. A click score function trained based on click-through feature vectors provides an information retrieval system, such as an Internet or intranet search engine, with information that may be used in determining the relevance of a content item to a query based on the click-through features thereof.

According to one embodiment, the present invention is directed towards a method for selecting a click score function to determine a click score of one or more query-content item pairs. The method comprises generating a training set comprising one or more query-content item pairs labeled with click scores by a human judge based on the relevance of the pair. For each labeled query-content item pair, a click score function is determined and a loss function is used to modify the click score function based on the click-through features of the content item. A click score function that produces the smallest loss is selected. The selected click score function may then be applied to the click-through feature vectors for a plurality of unlabeled query-content item pair for assigning click scores thereto.

According to one embodiment, the method for selecting the click score function comprises minimizing a difference between a click score for the given query-content item pair assigned by human judgments and an output of the click score function. According to another embodiment, the method for selecting the click score function comprises using a loss function selected from a set of loss functions including a least mean square loss function, a query pairwise loss function and a loss function that compares a desired ranking order with an output ranking order.

According to another embodiment, a method for indexing content items based on the application of a click score function to the click-through features of the content items is disclosed. According to one embodiment, the method comprises generating an inverted click-through index of the unlabeled content items and the associated query-score pairs, wherein a key to the index is a URL of a given content item. The inverted click-through index may be combined with a general content index by associating the query-score pairs with the content items in the content index. The combined content index provides an improved searching and document retrieval facility.

According to one embodiment, the method for indexing content items comprises retrieving one or more content items in a result set in response to receipt of the query from the user. For a given content item in the result set, a click-through feature vector is determined and a click score function is applied to the click-through feature vector to generate a click score, which is used to generate one or more <query, content-item, click-score> index entries for the given content item. One or more one or more <query, click-score> pairs are indexed for the content item.

According to one embodiment, the method for indexing content items comprises retrieving one or more content items in a result set in response to receipt of a query from the user. A determination is made whether an inverted click-through index exists for a given content item. If the inverted click-through index exists, the given query is compared with the query-score pairs in the inverted click-through index for the given content item. If the given query differs from the query-score pairs in the inverted click-through index by one or more terms, a partial click score is computed for the given query based on the indexed query-score pairs associated with the given content item.

According to one embodiment, the present invention is directed towards a system for indexing content items based on click-through features. The system comprises a index component operative to determine a click score function based on a training set of labeled query-content item pairs and the click-through features thereof, assign click scores to a plurality of unlabeled query-content item pairs through application of the click score function to the one or more click-through features and generate an inverted click-through index of the unlabeled content items and the associated query-score pairs. A relevance engine is operative for each query-content item pair to receive one or more click scores for one or more clicked queries in the index and generate a relevance score therefore. The relevance engine may also receive and utilize additional features of the one or more content items in generating a given relevance score. A search engine is operative to retrieve one or more content items in a result set in response to receipt of the query from the user and order the content items in the result set according to the relevance scores from the relevance engine.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE INVENTION

Embodiments of a method, system, and article of manufacture comprising software programs for utilizing feature-based retrieval functions for information retrieval systems in accordance with the present invention are described herein with reference to the drawings in FIGS. 1 through 4.

Figure 1:
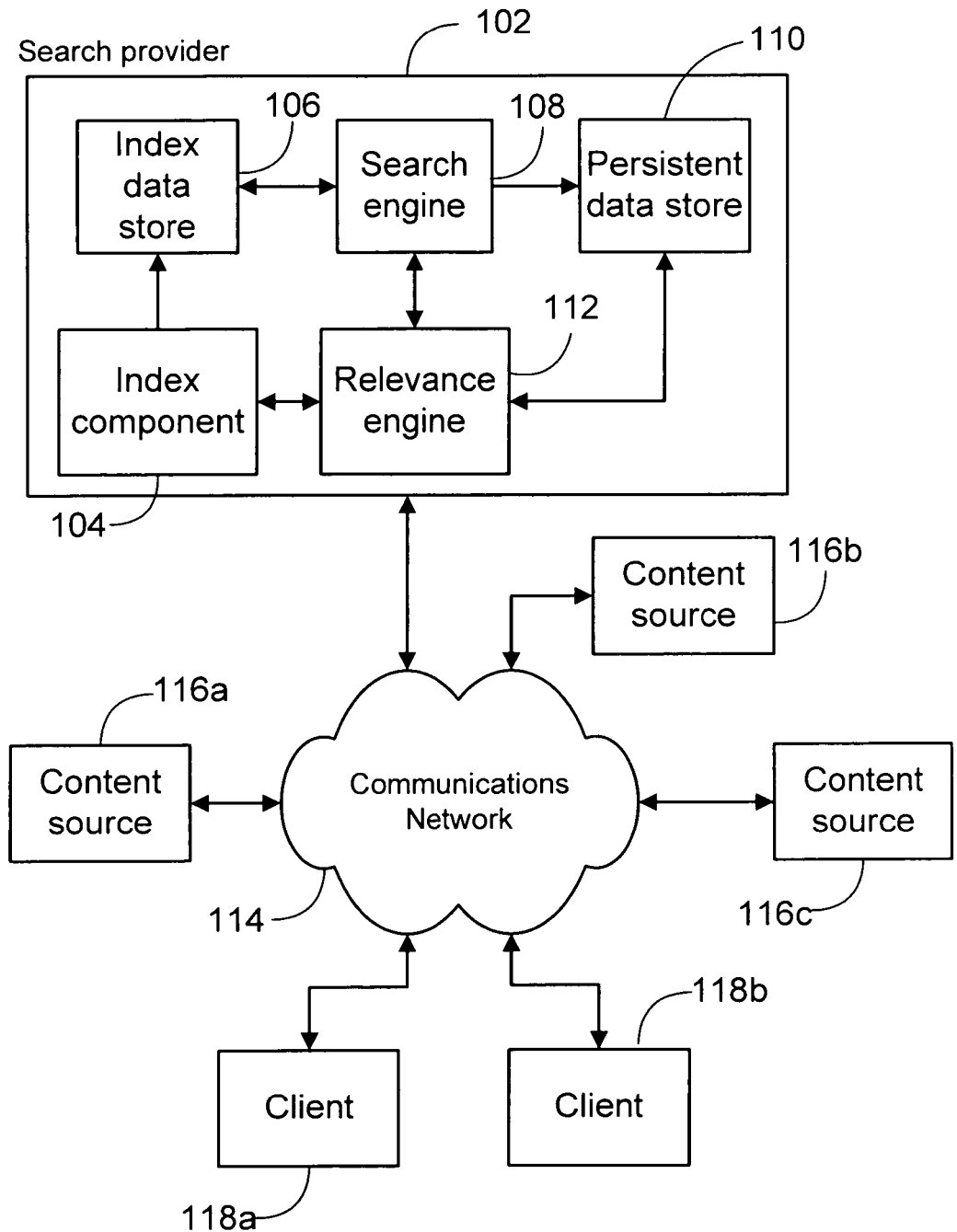
FIG. 1 is a block diagram presenting a system for indexing and searching web content based on the click-through features of the content items according to one embodiment of the present invention.

Turning to FIG. 1, a system comprising hardware and software components configured according to one embodiment of the present invention is illustrated. According to the embodiment of FIG. 1, a search provider 102 comprises one or more software and hardware components operative to facilitate the identification of content items responsive to a query and calculate the relevance of the content items to the query, which may be used for ranking purposes. The hardware and software components include, but are not limited to, an index component 104, a search engine 108 and a relevance engine 112. The search provider 102 also comprises one or more data stores for providing persistent storage of information used in searching and calculating relevance values for content items including, but not limited to, an index data store 106 and a persistent data store 110. Those of skill in the art should note that although the embodiment of FIG. 1 illustrates information retrieval in the context of a search engine, the systems and methods of the present invention are generally applicable to information retrieval tasks.

The search provider 102 is communicatively coupled with a network 114, which may include a connection to one or more local and wide area networks, such as the Internet and may provide access to linked networks of content items, e.g., the World Wide Web. Using the network 114, the search provider 102 is capable of accessing content sources 116a, 116b and 116c that host content items a user may wish to locate through use of the search engine 108 at the search provider 102. The search provider 102 may communicate with one or more content sources 116a, 116b and 116c for maintaining cached copies of content items that the content sources 116a, 116b and 116c host. The collection of content items, as well as information regarding content items, is referred to as "crawling ", and is the process by which the search provider 102 collects information upon which the search engine 108 performs searches. Exemplary methods for crawling information on a network is described in commonly owned U.S. Pat. No. 6,021,409, entitled "METHOD FOR PARSING, INDEXING AND SEARCHING WORLD-WIDE-WEB PAGES," the disclosure of which is hereby incorporated by reference in its entirety.

The search provider 102 crawls content sources 116a, 116b and 116c in communication with the network 114, such as the Internet, which may comprise collecting combinations of content items and information regarding the same. An index component 104 parses and indexes the content items and related information that the search provider 102 collects through the crawling process. The index component 104 generates a content index that defines a structure for the content items and related information that allows for location and retrieval of the content items and related information. According to one embodiment of the invention, the index component 104 creates a content index of word-location pairs that allows a search engine 108 to identify specific content items and information regarding the same in response to a query, which may be from a user, software component, automated process, etc. Exemplary methods for indexing information is described in commonly owned U.S. Pat. No. 5,745,889, entitled "METHOD FOR PARSING INFORMATION OF DATABASE RECORDS USING WORD-LOCATION PAIRS AND METAWORD-LOCATION PAIRS," the disclosure of which is hereby incorporated by reference in its entirety. The one or more indexes that the index component 104 generates are written to an index data store 106 for persistent storage and use by other components of the search provider 102.

A user of a client device 118a and 118b who desires to retrieve a content item from a content source 116a, 116b and 116c that is relevant to a particular topic, but who is unsure or ignorant regarding the address or location of the content item, submits a query to the search engine 108. According to one embodiment, a user utilizes a client device 118a and 118b to connect over the network 114 to the search engine 108 at the search provider 102 and provide a query. A typical query has one or more terms. For example, the query "2005 Lincoln continental" contains three terms and is referred to as a three-term query. Similarly, queries containing only one term are referred to as one-term queries, queries containing two terms are two-term queries, etc. A space or other delimiter character that the search engine 108 comprehends delimits individual terms comprising a query.

According to one embodiment of the invention, a client device 118a and 118b is a general purpose personal computer comprising a processor, transient and persistent storage devices, input/output subsystem and bus to provide a communications path between components comprising the general purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, etc. The client device 118a and 118b typically run software applications (such as a web browser) that provide for transmission of queries to the search provider 102, as well as receipt and display of result sets responsive to the queries.

Upon receipt of the query, the search engine 108 examines the content index using the terms that comprise the query in an attempt to identify a result set that contains those content items that are responsive to the query. The search engine 108 formulates the result set for transmission over the network 114 and presentation to the user through use of the client device 118a and 118b. Where the result set comprises a link to content items, such as a uniform resource locator (URL), the user may select a link in the result set to navigate to the content source that is hosting the content item that the link identifies. The search engine 108 utilizes a persistent data store 110 for storage of an historical log of the queries that users submit, which may include an indication of the selection of items in results sets that the search engine 108 transmits to users.

As discussed previously, users become increasingly frustrated when presented with a result set that does not identify content items are more relevant to a given query prior to less relevant items. Accordingly, the present embodiment provides an indexing component 104 that is operative to utilize machine learning that is trained based on click-through features of the content items to determine a click score of a given content item to a given query for use in determining relevance of the query-content item pair. The index component 104 receives pairs of queries and content items, applying a click score function, the selection of which is described in greater detail herein, to determine a click score for the content item vis-à-vis the query.

The index component 104 utilizes click-through "features" of a given query-URL pair to determine click score for the URL with regard to the query. According to one embodiment, a feature is a quantification of an aspect of a relationship between a query and content item represented by its URL, which may include quantifying aspects of the query, the content item, or both. Such query-dependent features may be represented as one or more values for a given query, a content item or both, and is referred to as a feature vector. In one embodiment, the index component 104 generates a click score based on one or more click-through features. The click-through features may include, but are not limited to, aggregated first-clicks, aggregated last-clicks, the average amount of time users stay on a website associated with the given URL, the spam score of each URL, the position of each URL in a given search results page, the expected clicks on that position, the frequency of that query in the query log, the popularity of each content item, etc. Using the click through features, the index component is operative to generate a click score that may be stored in the content index as another feature of a URL that the relevance engine may utilize in determining the relevance of a URL to a given query, e.g., for ranking purposes.

The index component applies a click score function to a given query-URL pair determine a click score for the pair. According to one embodiment, the click function that the index component utilizes is determined using machine learning techniques. The index component 104 receives a training set of query-content item pairs and a vector of click-through features associated therewith. The content items may be represented by their respective URLs. Content items from the training set to may be presented to one or more human subjects for labeling, which is the assignment of training click scores indicating the relevance of content items in the training set to the query. Alternatively, the index component 104 may access the persistent data store 110 to retrieve a past query (training query) and corresponding result set (training set), utilizing selection information from a user regarding the selection of items in the result set in response to the query to determine training click scores for the content items in the training set. On the basis of the training click scores, content items in the training set and the training query, the index component 104 is operative to compute a click score function, which the index component 104 applies to the click-through features of unlabeled content items stored in the index data store 106 to assign click scores to each query-content item pair.

Once the click scores have been assigned to the query-content item pairs, the index component 104 is operative to generate an inverted click-through index for each content item in its index, which the index data store 106 maintains. The URL of a given content item may be used as a key to the inverted click-through index. The inverted index may then be persistently stored along with the content index in the index data store 106 and used by other components of the search provider 102. Alternatively, index component 104 may supplement the content index at the index data sore 106 with click score information.

According to one embodiment, when a user of client device 118a or 118b submits a query to the search engine 108, the relevance engine 112 may utilize information in both the content and inverted click-through indexes, e.g., click score, for content items that are responsive to the query to generate relevance scores for the content items. These content items, or their URLs, may be retrieved from the index at the index data store 106 and presented to the user in order of relevance as indicated by the relevance engine 112.

In the event the query submitted by the user through a client device 118a and 118b does not have a matching query-score pair in the inverted click-through index for a responsive content item, the index component 104 computes a partial click score for the query-content item pair, which accounts for any extra or missing words in the given query that differ it from the indexed queries. The search engine 108 receives the click scores, or click scores, for the content items in the result set and passes these data to the relevance engine 112, which utilizes click scores (which may include utilization of other features) for calculating relevance scores. The search engine may use the relevance scores for ranking or ordering purposes, e.g., presenting the content items or links to content items with the highest relevance scores (more relevant) prior to the content items or links to content items in the result set with lesser relevance scores (less relevant). The search engine 108 transmits the ranked result set to the client device 118a and 118b for viewing by the user.

Figure 2:
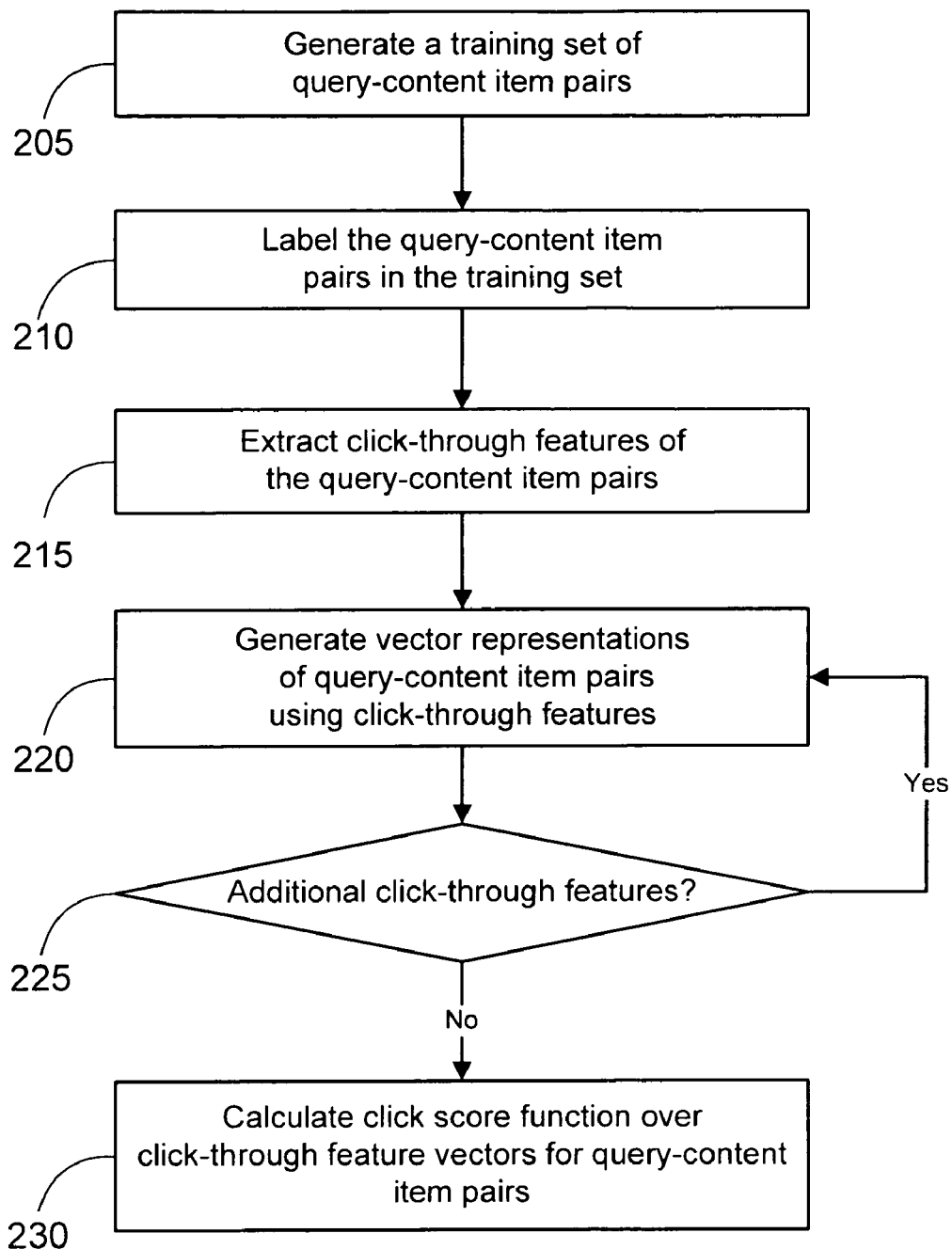
FIG. 2 is a flow diagram illustrating a method for computing a click score function according to one embodiment of the present invention.

FIG. 2 presents a flow diagram illustrating one embodiment of a method for selecting a click score function for determining a click score of a query-content pair. The determination of a click score function is predicated on the generation of a training set, step 205. The training set may comprise a plurality of query-URL pairs. Each pair in the training set may have an associated log of click-through features, such as aggregated first-clicks, aggregated last-clicks, the average amount of time users stay on the website associated with the give URL, the spam score of each URL, the position of each URL in the content index, the expected clicks on that position, the frequency of that query in the query log, the popularity of the website identified by the URL, e.g., number of clicks, and the like. The click through features may be used to evaluate the relevance of a content item to a query. According to one embodiment, human candidates may evaluate the relevance of a content item to a query and to label each query-content pair in the training set according, step 210. A label may be a numeric value, for example, on the scale of zero to four, where four can indicate the highest relevance and zero the lowest. In other embodiments, various other forms of labeling know to those of skill in the art may be used to assign relevance values to the training set.

Having assigned labels to the training set of query-content item pairs, click-through features associated with the labeled query-content item pair may be extracted, step 215. Click-through feature vectors may be generated for each labeled pair in the training set, step 220. For example, the following vector representation may be used to represent K click-through features for a given labeled query-content item pair: <$ctrf_1, ctrf_2, \ldots, ctrf_K$>. If additional click-through features are added to the given query-content item pairs, the feature vectors for such pairs may be extended in the following manner: <$ctrf_1, ctrf_2, \ldots, ctrf_K, ctrf_{K+1}, ctrf_{K+2} \ldots Ctrf_{K+M}$>, where M is the total number of click-through related features newly added, step 225.

Having identified the vector representations of the click-through features for each query-content item pair in the training set, a regression function may be determined for mapping from various click-through features to relevance judgments on the labeled query-content item pairs, step 230. According to one embodiment, such a regression function mapping may be expressed in the following manner:

$$x_i \xrightarrow{h} y_i,$$
$$i = 1, 2, \ldots, N$$

where $x_i$ is the vector representation of ith query-content item pair in the training set in terms of its click-through features; $y_i$ is its numerical value reflecting the degree of relevance, such as the values of 0, 1, 2, 3, or 4 that correspond to the editorial grades of perfect, excellent, good, fair and bad, respectively; N is the totally number of query-content item pairs in the training set; and h is a click score function.

A click score function, h, may be selected that results in the smallest possible loss over all query-content item pairs in the training set. According to one embodiment, such a click score function may be computed by minimizing the following empirical loss function:

The value of the loss function L is the summation of the square of the difference between a training click score for the query-content item pair and the output of a click score $$L(h) = \sum_{i=1}^{N} (y_i - h(x_i))^2$$

function h for determining relevance on the basis of the feature vector $x_i$. An optimal click score function results in a smallest value for L, e.g., zero. According to one embodiment, any regression method known to those of skill in the art may be applied to minimize the above loss function, such as linear regression, logistic regression, support vector machine (SVM), gradient boosting tree, or the like, step 230. The selected click score function is stored for use in determining a click score for unlabeled query-content item pairs.

Figure 3:
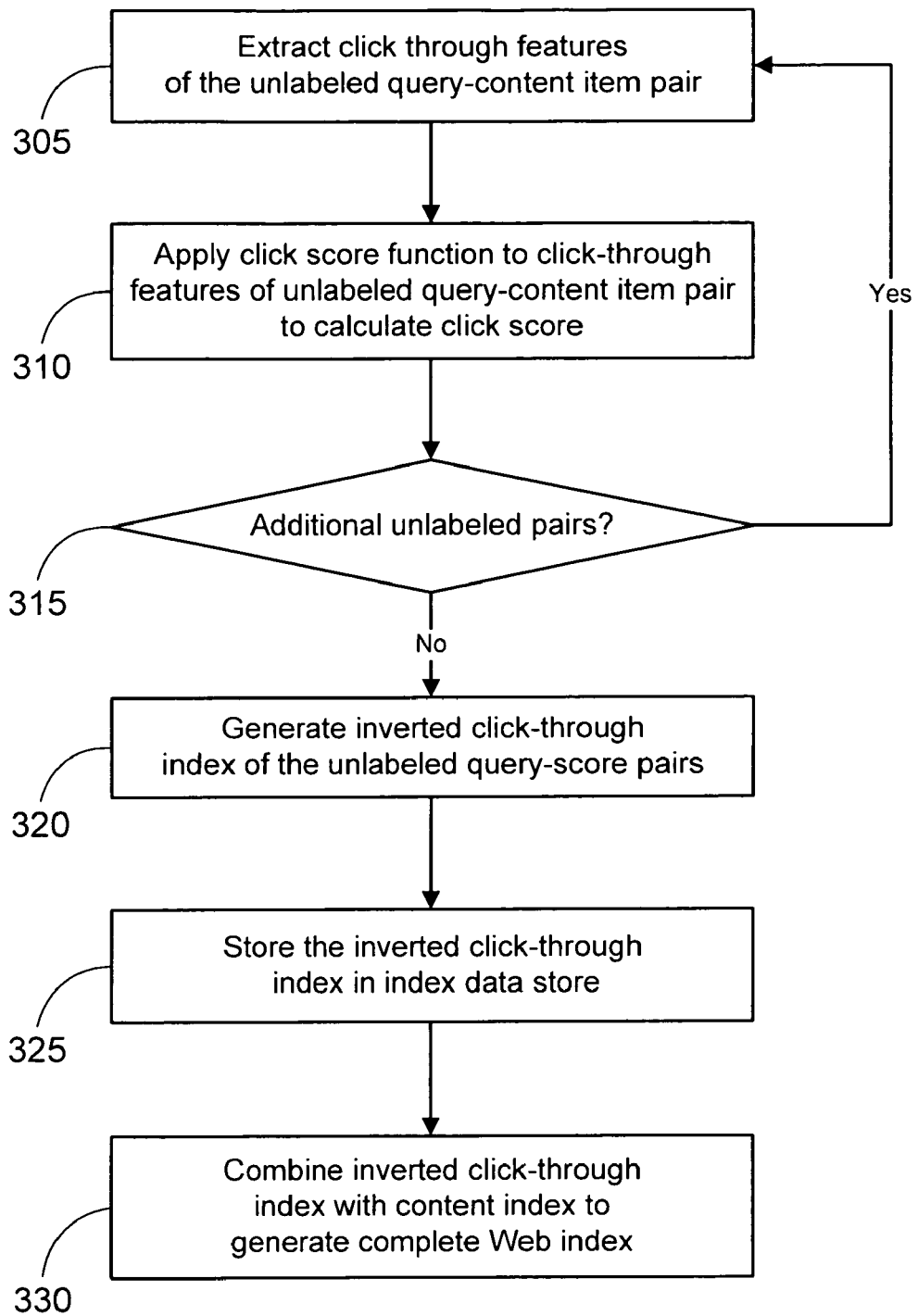
FIG. 3 is a flow diagram illustrating a method for indexing unlabeled content items based on click-through features according to one embodiment of the present invention.

FIG. 3 presents one embodiment of a method for using a selected click score function to generate and index click scores for the unlabeled content items, e.g., web pages. A URL identifies each content item, which may also have one or more queries and click-through feature logs associated therewith. The click-through features for each content item may include, but are not limited to, aggregated first-clicks, aggregated last-clicks, the average amount of time users stay on the website associated with the given URL, the spam score of each URL, the position of each URL, the expected clicks on that position, the frequency of that query in the query log, the popularity of each URL, etc.

According to one embodiment, the indexing component is operative to extract click-through features for each unlabeled query-content item pair in an index, step 305, and evaluate the extracted click-through features, which may be one or more features. The set of features that are selected may be made in advance of the evaluation, e.g., by a system administrator identifying the features for inclusion, or may be made at the time of the evaluation. The index component applies a click score function, which may be computed in accordance with a method described herein, to the selected click-through features to calculate a click score for the given query-content item pair, step 310. The computed click score may be stored along with the associated query and URL of the given content item in the respective content source in the following manner: <query, URL, click-through relevance score>. The index component checks if additional query-content item pairs require processing, step 315, and if so, repeats steps 305 and 310.

Having assigned click scores to query-content item pairs stored in the index, the index component generates an inverted click-through index of the content items, step 320. According to one embodiment, the index component indexes all query-score pairs into an inverted click-through index, a key to which is a URL associated therewith. The resultant index comprises a plurality of items having the following format: URL→(query1, score1), (query2, score2), (query3, score3), ..., (query n, score n). The index component stores the inverted click-through index in the index data store, step 325, which may then be combined with the content index previously stored in the index data store to generate an improved content index, step 330. Thus, in the combined content index, each content item is designated by its URL and has a one or more click-through feature-based query-score pairs associated therewith.

The click-through index may be periodically checked to determine whether click scores associated with the indexed query-content item pairs require recalculation in view of newly available click-through features, e.g., from query logs. If additional click-through features have been added to the given query-content item pairs since the last index update, the feature vector for the given pair can be extended in the following manner: $<ctrf_1, ctrf_2, \ldots, ctrf_K, ctrf_{K+1}, ctrf_{K+2} \ldots, ctrf_{K+M}>$, where M is the total number of click-through related features newly added. The index component may determine whether the new click-through features effect the click score of the given query-content item pair and, if so, recomputed the click score for the given query-content item pair by applying a click score function to the new feature vector.

Figure 4:
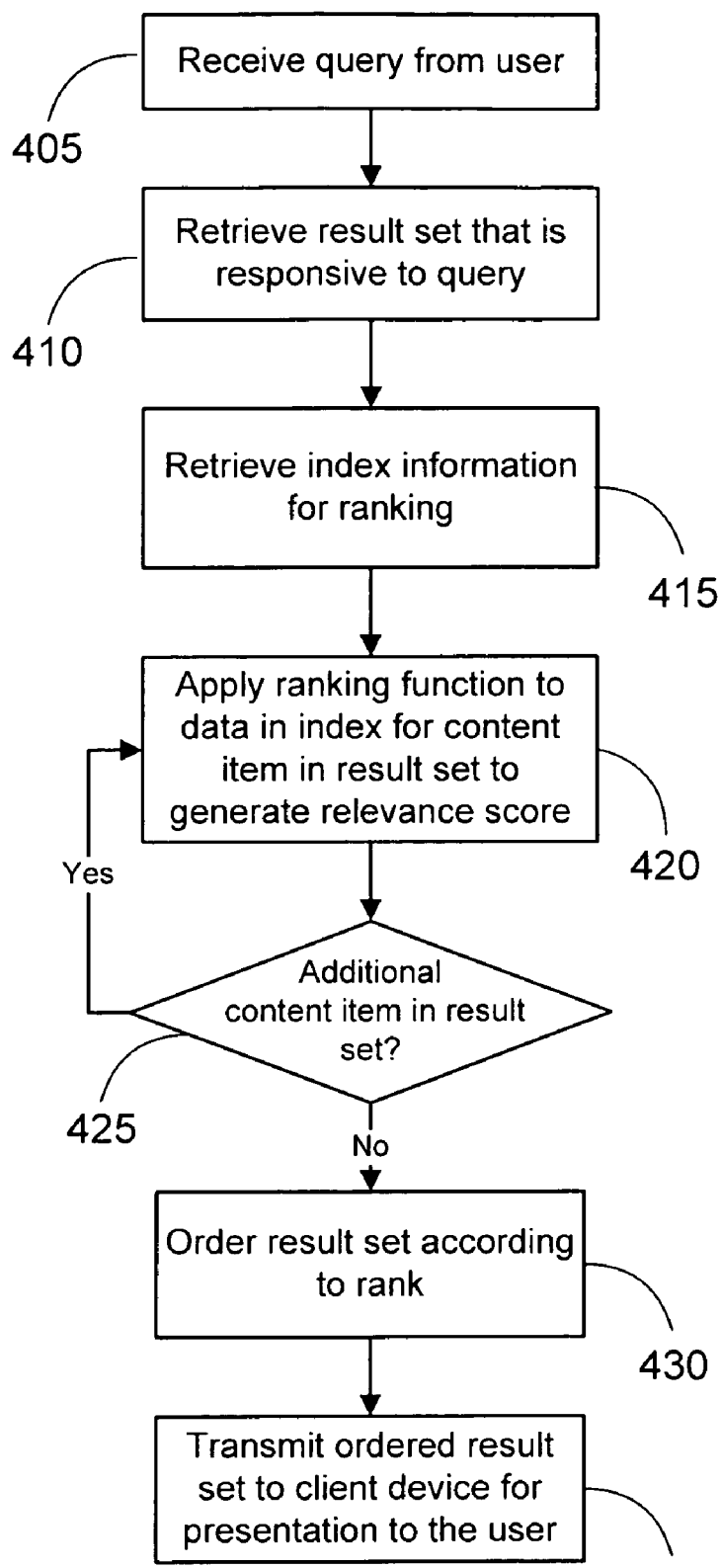
FIG. 4 is a flow diagram illustrating a method for searching indexed content items according to one embodiment of the present invention.

FIG. 4 presents one embodiment of a method for ordering search results that accounts for click score information. A user submits a query to the search engine, step 405, which causes the search engine to identify one or more entries in an index in the index data score that are responsive to the query, step 410, e.g., relevant to the query. In some embodiments, only content items including or associated with one or more terms in the query are included in the result set, e.g., that contain user supplied tags that contain the terms. Alternatively, or in conjunction with the foregoing, the search engine may utilize other criteria to select content items for inclusion in the result set, such as a click score for the query-URL pair.

The search engine retrieves information from the index for the content items the result set, step 415. The index from which the search engine retrieves the information may include, but is not limited to, query-click score pairs, anchor text-weighting score pairs, title text, body text, etc. The search engine applies a relevance function to determine the relevance of a given content item in the result set to the query from the user, step 420. The relevance function receives these data from the index, which the relevance function utilizes to generate a relevance score for a given content item in the result set. The relevance function may be determined using a variety of information retrieval techniques known to those of skill in the art. For example, the relevance function may be determined by hand-constructing the function through the combinations of text similarity techniques including, but not limited to, term frequency, inverse document frequency, proximity, document popularity measures (e.g., page rank), etc. The relevance function may be also determined using a variety of machine learning techniques known to those of skill in the art including, but not limited to, Support Vector Machine, Boosted Trees, other machine learning techniques.

The search engine applies the ranking function to data from the index for a given content item in the result set to generate a relevance score for the given content item, step 420. A check is performed to determine if any additional content items exist in the result set for which the search engine is to generate a relevance score, step 425. Where additional content items exist in the result set for processing, step 425, processing returns to step 420 with the search engine generate a relevance score for a given content item. The search engine generates relevance score for the items in the result set, which the search engine utilizes to rank or order the result set, step 430. The ordered result set is transmitted to the client device for presentation to the user, step 435.

The foregoing description, for purposes of explanation, uses specific nomenclature and formula to provide a thorough understanding of the invention. It should be apparent to those of skill in the art that the specific details are not required in order to practice the invention. The embodiment have been chosen and described to best explain the principles of the invention and its practical application, thereby enabling others of skill in the art to utilize the invention and various embodiments with various modifications as are suited to the particular use contemplated. Thus, the foregoing disclosure is not intended to be exhaustive or to limit the invention to the precise forms disclosed and those of skill in the art recognize that many modifications and variations are possible in view of the above teachings.

What is claimed is:

1. A method for indexing content items based on click-through features, the method comprising:
    generating a training set comprising one or more query-content item pairs, wherein a given query-content item pair has one or more click-through features associated therewith, the one or more click-through features including two or more of an average amount of time users stay on a website associated with a given URL, a spam score of the given URL, expected clicks at a position of the given URL in a given search results page and frequency of a query in a query log;
    labeling one or more query-content item pairs in the training set by assigning click score thereto based on the one or more click-through features thereof, wherein labeling a given content item in the training set comprises providing a given query-content item pair to a human judge to assign a click score;
    determining a click score function using a loss function based on the click scores of the labeled query-content item pairs and the click-through features thereof;
    applying the click score function to a plurality of unlabeled query-content item pairs to determine click scores thereof based on the one or more click-through features of the unlabeled query-content item pairs;
    generating an inverted click-through index of the unlabeled query-content item pairs and the associated query-score pairs, wherein a key to the index is a URL of the content item; and
    combining the inverted click-through index with a content index by associating the unlabeled query-content item pairs with content items in the content index.

2. The method of claim 1 further comprising the step of identifying a content item using a Uniform Resource Locator ("URL").

3. The method of claim 1 wherein determining the click score function comprises minimizing a difference between a click score for the given query-content item pair and an output of the click score function.

4. The method of claim 1 wherein the loss function is selected from a set of loss functions including least mean square loss function, a query pairwise loss function and a loss function that compares a desired ranking order with an output ranking order.

5. The method of claim 1 comprising storing the determined click score function for application to an unlabeled query-content item pair.

6. The method of claim 1 comprising the steps of: retrieving one or more content items in a result set in response to receipt of the query from the user; for a given content item in the result set, determining a click-through feature vector for the given content item; applying the click score function to the click-through feature vector for the given content item to generate a click score for the given content item; generating one or more <query, content-item, click-score> data structures for the given content item; indexing one or more <query, click-score> pairs for the content item from the <query, content-item, click-score> data structures.

7. A system of one or more processing devices for indexing and searching content items based on its one or more click-through features, the system comprising:

an index component, executed on the one or more processing devices, operative to determine a click score function using a loss function based on a training set of labeled query-content item pairs and the click-through features thereof, the one or more click-through features including two or more of an average amount of time users stay on a website associated with a given URL, a spam score of the given URL, expected clicks at a position of the given URL in a given search results page and frequency of a query in a query log, wherein the training set of labeled query-content items comprises a plurality of query-content items having click scores assigned thereto by a human judge, assign click scores to a plurality of unlabeled query-content item pairs through application of the click score function to the one or more click-through features, generate an inverted click-through index of the unlabeled content items and the associated query-score pairs and combine the inverted click-through index with a content index by associating the unlabeled query-content item pairs with content items in the content index;

a relevance engine, executed on the one or more processing devices, operative to receive one or more query scores for one or more content items and generate one or more relevance scores therefore; and a search engine, executed on the one or more processing devices, operative to retrieve one or more content items in a result set in response to receipt of the query from the user and order the content items in the result set according to the relevance scores from the relevance engine.

8. The system of claim 7 wherein a Uniform Resource Locator (URL) of a content item is used as a key to locate the given content item the inverted click-through index.

9. The system of claim 7 wherein the click score function is determined by minimizing difference between click score for the given query-content item pair in the training set and the output of the click score function.

10. The system of claim 7 wherein the loss function is selected from a set of loss functions including a least mean square loss function, a query pairwise loss function and a loss function that compares a desired ranking order with an output ranking order.

11. The system of claim 7 wherein the index component is operative to store the determined click score function for application to an unlabeled query-content item pair.

* * * * *